(12) United States Patent
Beller et al.

(10) Patent No.: US 10,606,849 B2
(45) Date of Patent: *Mar. 31, 2020

(54) TECHNIQUES FOR ASSIGNING CONFIDENCE SCORES TO RELATIONSHIP ENTRIES IN A KNOWLEDGE GRAPH

(71) Applicant: INTERNATIONAL BUSINESS MACHINES CORPORATION, Armonk, NY (US)

(72) Inventors: Charles E. Beller, Baltimore, MD (US); Chengmin Ding, Chantilly, VA (US); Adam Dumey, Falls Church, VA (US); Elinna Shek, Aldie, VA (US)

(73) Assignee: International Business Machines Corporation, Armonk, NY (US)

( * ) Notice: Subject to any disclaimer, the term of this patent is extended or adjusted under 35 U.S.C. 154(b) by 539 days.

This patent is subject to a terminal disclaimer.

(21) Appl. No.: 15/253,113

(22) Filed: Aug. 31, 2016

(65) Prior Publication Data

US 2018/0060733 A1 Mar. 1, 2018

(51) Int. Cl.
*G06F 16/901* (2019.01)
*G06N 5/02* (2006.01)
(Continued)

(52) U.S. Cl.
CPC .... *G06F 16/24578* (2019.01); *G06F 16/9024* (2019.01); *G06N 5/022* (2013.01); *G06N 20/00* (2019.01)

(58) Field of Classification Search
None
See application file for complete search history.

(56) References Cited

U.S. PATENT DOCUMENTS 7,571,177 B2 8/2009 Damle
7,877,343 B2 * 1/2011 Cafarella ............... G06Q 10/02
706/20

(Continued)

FOREIGN PATENT DOCUMENTS

EP 1881482 B1 * 12/2018 ........... G10L 15/063
WO 03032199 4/2003

OTHER PUBLICATIONS

Nickel, Maximilian, Kevin Murphy, Volker Tresp, and Evgeniy Gabrilovich. "A review of relational machine learning for knowledge graphs." Proceedings of the IEEE 104, No. 1 (2016): 11-33. (Year: 2016).*

(Continued)

*Primary Examiner* — Alexey Shmatov
*Assistant Examiner* — Casey R. Garner
(74) *Attorney, Agent, or Firm* — Michael R. Long; Diana R. Gerhardt (57) ABSTRACT

A technique for assigning confidence scores to relationship entries in a knowledge graph includes assigning respective initial confidence scores to relationship n-tuples in a knowledge graph. Each of the relationship n-tuples designates at least a first entity, a second entity, and a relationship between the first and second entities or a single entity and a relationship between the single entity and one or more properties of the single entity. Respective feature vectors are associated with each of the relationship n-tuples. A training set that includes at least a subset of the relationship n-tuples labeled with respective ground truth labels is generated. Respective initial weights are learned for the feature vectors based on the training set. Respective subsequent confidence scores are generated for each of the relationship n-tuples based on the initial weights for the feature vectors.

20 Claims, 7 Drawing Sheets

(51) Int. Cl.
   *G06F 16/2457* (2019.01)
   *G06N 20/00* (2019.01)

(56) References Cited

U.S. PATENT DOCUMENTS

| | | | |
|---|---|---|---|
| 8,594,996 B2 | 11/2013 | Liang et al. | |
| 9,235,653 B2 | 1/2016 | Talmon et al. | |
| 9,466,297 B2 | 10/2016 | Crook et al. | |
| 9,613,166 B2 | 4/2017 | Lightner et al. | |
| 9,645,999 B1* | 5/2017 | Ciulla | G06F 17/2785 |
| 9,697,475 B1* | 7/2017 | Subramanya | G06N 20/00 |
| 2007/0067285 A1 | 3/2007 | Blume et al. | |
| 2009/0012842 A1* | 1/2009 | Srinivasan | G06F 16/3344 705/12 |
| 2009/0162824 A1 | 6/2009 | Heck | |
| 2011/0106807 A1* | 5/2011 | Srihari | G06F 16/288 707/739 |
| 2012/0109964 A1* | 5/2012 | Jiang | G06F 16/48 707/739 |
| 2012/0215777 A1* | 8/2012 | Malik | G06K 9/6259 707/737 |
| 2015/0095319 A1 | 4/2015 | Ormont et al. | |
| 2015/0127632 A1 | 5/2015 | Khaitan et al. | |
| 2015/0379414 A1 | 12/2015 | Yeh et al. | |
| 2016/0055409 A1 | 2/2016 | Majumdar et al. | |
| 2016/0140858 A1* | 5/2016 | Adderly | G09B 7/02 704/9 |
| 2016/0180242 A1* | 6/2016 | Byron | G06N 20/00 706/11 |

OTHER PUBLICATIONS

Kasneci, Gjergji, Maya Ramanath, Fabian Suchanek, and Gerhard Weikum. "The YAGO-NAGA approach to knowledge discovery." ACM SIGMOD Record 37, No. 4 (2009): 41-47. (Year: 2009).*

Cheng, Weiwei, Gjergji Kasneci, Thore Graepel, David Stern, and Ralf Herbrich. "Automated feature generation from structured knowledge." In Proceedings of the 20th ACM international conference on Information and knowledge management, pp. 1395-1404. ACM, 2011. (Year: 2011).*

Kasneci et al., "NAGA: Searching and Ranking Knowledge", IEEE, 2008.

* cited by examiner

TECHNIQUES FOR ASSIGNING CONFIDENCE SCORES TO RELATIONSHIP ENTRIES IN A KNOWLEDGE GRAPH

This invention was made with government support under Government Contract Number 2013-12101100008 awarded by Defense Advanced Research Projects Agency. The government has certain rights in the invention.

This application is related to U.S. patent application Ser. No. 15/253,144, entitled "RESPONDING TO USER INPUT BASED ON CONFIDENCE SCORES ASSIGNED TO RELATIONSHIP ENTRIES IN A KNOWLEDGE GRAPH," by Charles E. Beller et al., filed on Aug. 31, 2016, the disclosure of which is hereby incorporated herein by reference in its entirety for all purposes.

BACKGROUND

The present disclosure is generally directed to knowledge graphs and, more specifically to techniques for assigning confidence scores to relationship entries in a knowledge graph utilized in conjunction with data processing systems, such as a question answering systems and/or information retrieval systems.

Watson is a question answering (QA) system (i.e., a data processing system) that applies advanced natural language processing, information retrieval, knowledge representation, automated reasoning, and machine learning technologies to the field of open domain question answering. In general, conventional document search technology receives a keyword query and returns a list of documents, ranked in order of relevance to the query (often based on popularity and page ranking). In contrast, QA technology receives a question expressed in a natural language, seeks to understand the question in greater detail than document search technology, and returns a precise answer to the question.

The Watson system reportedly employs more than one-hundred different algorithms to analyze natural language, identify sources, find and generate hypotheses, find and score evidence, and merge and rank hypotheses. The original Watson system implemented DeepQA™ software and the Apache™ unstructured information management architecture (UIMA) framework. Software for the original Watson system was written in various languages, including Java, C++, and Prolog, and runs on the SUSE™ Linux Enterprise Server 11 operating system using the Apache Hadoop™ framework to provide distributed computing. As is known, Apache Hadoop is an open-source software framework for storage and large-scale processing of datasets on clusters of commodity hardware. The original Watson system employed DeepQA software to generate hypotheses, gather evidence (data), and analyze the gathered data. The original Watson system was workload optimized and integrated massively parallel POWER7® processors. The original Watson system included a cluster of ninety IBM Power 750 servers, each of which included a 3.5 GHz POWER7 eight core processor, with four threads per core. In total, the original Watson system had 2,880 POWER7 processor cores and 16 terabytes of random access memory (RAM). Reportedly, the Watson system can process 500 gigabytes, the equivalent of one million books, per second. Sources of information for the Watson system include encyclopedias, dictionaries, thesauri, newswire articles, and literary works. The Watson system also uses databases, taxonomies, and ontologies.

Cognitive systems learn and interact naturally with people to extend what either a human or a machine could do on their own. Cognitive systems help human experts make better decisions by penetrating the complexity of 'Big Data'. Cognitive systems build knowledge and learn a domain (i.e., language and terminology, processes and preferred methods of interacting) over time. Unlike conventional expert systems, which have required rules to be hard coded into an expert system by a human expert, cognitive systems can process natural language and unstructured data and learn by experience, similar to how humans learn, by implementing trained machine models, pattern recognition, and machine learning algorithms. While cognitive systems have deep domain expertise, instead of replacing human experts, cognitive systems act as a decision support system to help human experts make better decisions based on the best available data in various areas (e.g., healthcare, finance, or customer service).

BRIEF SUMMARY

Disclosed are a method, a data processing system, and a computer program product (embodied in a computer-readable storage device) for assigning confidence scores to relationship entries in a knowledge graph.

A technique for assigning confidence scores to relationship entries in a knowledge graph includes assigning respective initial confidence scores to relationship n-tuples in a knowledge graph. Each of the relationship n-tuples designates at least a first entity, a second entity, and a relationship between the first and second entities or a single entity and a relationship between the single entity and one or more properties of the single entity. Respective feature vectors are associated with each of the relationship n-tuples. A training set that includes at least a subset of the relationship n-tuples labeled with respective ground truth labels is generated. Respective initial weights are learned for the feature vectors based on the training set. Respective subsequent confidence scores are generated for each of the relationship n-tuples based on the initial weights for the feature vectors.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The description of the illustrative embodiments is to be read in conjunction with the accompanying drawings, wherein.

DETAILED DESCRIPTION

The illustrative embodiments provide a method, a data processing system, and a computer program product (embodied in a computer-readable storage device) for assigning confidence scores to relationship entries in a knowledge graph.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized. As may be utilized herein, the term 'coupled' encompasses a direct electrical connection between components or devices and an indirect electrical connection between components or devices achieved using one or more intervening components or devices. As used herein, the terms 'data' and 'evidence' are interchangeable. As used herein, the terms 'computer readable storage medium' and 'computer-readable storage device' are interchangeable.

Traditionally, knowledge graphs (KGs) have been configured to store information about a specific domain and have been composed of entities (nodes) and relationships (edges) between the entities. Each entity may have one or more attributes that describe the entity. Unstructured content, such as journals, literature, and reference manuals, may be accessed to extract entities for a given domain and relationships between the entities. Annotators/extractors may be created to extract entities from unstructured content based on a statistical/rule based approach. In general, annotators use lexicons and dictionaries to establish patterns that facilitate extracting entities from unstructured content (e.g., unstructured documents). A KG, in general, supports analysis of entities included within the KG. A KG may, for example, be utilized by a question answering (QA) system to answer a received question or by a search system to provide relevant results to a search query. It should be appreciated that relationships between entities stored within a KG may be wrong or become stale. For example, assume that a KG stores a relationship between a football player 'A' and a professional football team 'B' that originally drafted the player 'A' out of college. In the event the player 'A' is later traded to a new professional football team 'C', the relationship defining the player 'A' as associated with the team 'B' is stale and may no longer be relevant in answering a question about the player 'A' or providing relevant search results about the player 'A'.

According to one aspect of the present disclosure, techniques for assigning initial confidence scores to relationship entries in a KG are disclosed. According to another aspect of the present disclosure, automatic promotion techniques for expanding a training set for a KG are also disclosed. As is known, KGs are used in many applications, such as search and question answering systems, to capture, store, and provide semantic information and relationships between entities (e.g., people, places, and objects). A KG may consolidate inputs from multiple source types and from both structured and unstructured data. In various embodiments, information about entities is extracted from data and is utilized to populate the KG. While conventional KG systems have captured and stored semantic information between entities, conventional KG systems have not provided any indication of the accuracy of the semantic information.

As conventional KG systems have not provided any way to differentiate a credibility of relationships between entities (which may have been discovered using various technologies), erroneous relationship information between entities may subsequently be used in downstream semantic analytics resulting in, for example, an erroneous answer being provided by a question answering (QA) system. According to one or more embodiments of the present disclosure, in order to improve the accuracy of KG systems, confidence scores are assigned to relationships (i.e., linkages) between entities to form relationship triples (i.e., entity 'A'; entity 'B', relationship information for entities 'A' and 'B'). While the discussion herein is focused on relationship triples (3-tuples), it should be appreciated that the techniques disclosed herein may be broadly applied to relationship n-tuples, where 'n' is greater than or equal to two. A 2-tuple may represent, for example, a single entity and a property (or label) of the single entity, e.g., the single entity may be 'John Doe' and the label may be 'football player'. It should also be appreciated that mining for relationships between entities and assigning confidence scores to the mined relationships may require a considerable amount of cognitive work. In general, current technologies focus on populating a KG with semantic information between entities but have not evaluated a relationship defined between entities for accuracy.

According to one or more embodiments of the present disclosure, techniques for initially assigning and updating confidence scores of relationship entries in a KG are disclosed. In at least one embodiment, the techniques include initially populating a KG with relationship triples that are extracted (by one or more extraction tools) from data (i.e., one or more source document collections). A KG may be initially populated with relationship triples extracted from various source document collections (e.g., the NY Times™, AP News™, Twitter™, particular discussion forums, etc.) using one or more extraction tools. It should be appreciated that an extraction tool can take the form of various rule based or statistical relationship extraction tools, e.g., statistical information and relation extraction (SIRE), SystemT™, LanguageWare/Concept Detector™, WDA prolog Rules™, etc.

According to the present disclosure, at time zero (T0) an initial confidence score is assigned to each relationship triple. Assigning an initial confidence score to each relationship triple may be implemented by, for example, setting initial confidence scores to a midpoint of an accepted range or to random values distributed around the midpoint. As one example, if confidence scores range between zero and one (i.e., [0 1]), then initial confidence scores may be set to '0.5'. As another example, if confidence scores range between minus one and plus one (i.e., [−1 1]), then initial confidence scores may be set to '0'. Prior knowledge about relationships between entities may also be utilized to determine that initial scores should be set on one side of the midpoint.

Then, each relationship triple is associated with a feature vector that includes both static features and dynamic features. Static features are things that do not change, e.g., document(s), collection(s), and tool(s) from which a relationship was extracted. Dynamic features may include things such as a reputation of an author of the source (e.g., a 'klout'score) and supporting search-engine 'click log' data. As values of dynamic features, by definition, change over time a periodic recalculation of the confidence scores may be desirable. Depending on the nature of the features and availability of prior knowledge (e.g., expertise of a curator), the feature vectors (which can be either generated via an unsupervised machine learning model or manually created) may be encoded, as nominal, ordinal, or continuous values. To make a model more effective, feature vector values may, for example, be encoded or normalized to a value between 0 and 1. Feature vectors may take into account: the technologies used to extract entities from data (e.g., SIRE, System T, OpenNLP™)—nominal; the sources that provided the data (e.g., AP News, Wikipedia™, NY Times)—nominal; the number of times a relationship is mentioned in the data—ordinal; the relationship type (e.g., LocatedAt)—nominal; the source entity type (e.g., person, equipment)—nominal; the target entity type (e.g., building, airport)—nominal; a source author's 'klout' score (if available)—continuous; and/or the 'click log' count (showing popularity)—ordinal.

Next, a number of ground truth labels are provided on (a subset of) the initial relationship triples. The ground truth labels, e.g., indicating 'good' or 'bad', may be derived from a curated source of relationships or from a trusted user or users. Then, initial weights for the feature vectors are learned at time zero (T0) using the relationship triples that are labeled with ground truth data as training data. Ideally, all feature vectors in a training set are assigned values and cover as many encodings as possible, e.g., using orthogonal experimental design method (OEDM). Next, dynamic components of the feature vectors may be updated at time '1' (T1). Normalization can, for example, be utilized when the feature vectors are updated.

Then, at T1, a confidence score for each relationship triple is calculated based on the initial weights for the feature vectors learned at T0. As one example, a confidence score for a relationship triple may correspond to its feature vector values and the associated initial weights. Next, new relationship triples may be promoted to the training set for future training iterations. As one example, to automatically promote relationship triples to the training set the confidence score assigned by a previous model (s_conf) and a calculated 'robustness' score (s_robust) of the previous model may be utilized. The robustness score is intended to capture user behavior that would validate a confidence score of a model. The robustness score is a function that may include, for example, the following variables: the number of users that viewed a relationship triple; the number of trusted (known competent and non-malicious) users that viewed a relationship triple; the number of clicks on a relationship triple; the number of exports of the relationship triple; the percent of eligible mouse hover-time over the relationship triple when presented to a user; the number of mouse saccades (or percentage of eligible saccades) to the relationship triple; the average number of user ratings of the relationship triple (where available); and/or any other user input.

In one or more embodiments, thresholds on confidence and robustness (t_conf, t_robust) and a joint threshold (t_joint) are implemented. In one embodiment, if the combined score s_joint (s_joint=s_conf*s_robust) for a given relationship triple surpasses the joint threshold (t_joint) for the given relationship triple then the relationship triple is a candidate for promotion. In at least one embodiment, if s_joint>=t_joint, s_conf>=t_conf, and s_robust>=t_robust for a relationship triple, then the relationship triple is automatically added to the training set for the next training iteration. In some embodiments, automatically promoted relationship triples receive a different weighting than manually labeled training relationship triples (i.e., manually labeled relationship triples may contribute more heavily to a loss function than automatically added relationship triples).

There are two kinds of possible mismatches between thresholds and scores, i.e., s_joint>=t_joint, but s_conf<t_conf and s_joint>=t_joint, but s_robust<t_robust. For s_joint>=t_joint, but s_conf<t_conf, the robustness score is providing all of the evidence that a relationship triple should be included and the previous model does not indicate that the relationship triple is a good example (such relationship triples can be flagged for manual inspection). For s_joint>=t_joint, but s_robust<t_robust, the previous model is providing all of the evidence with little support from the robustness metric. This can occur with newer relationships that have seen little interaction or in cases where the previous model is wrong (such relationship triples can also be flagged for manual inspection). If too many relationship triples are in this category, it can be an indicator that the previous model is off (the number of these cases in a given sample may be used as a trigger for further retraining or manual error analysis).

Next, confidence scores (which are used to rank relationship triples) are presented to a user. It should be appreciated that when new relationship triples are added at time 'N' (TN) weights for feature vectors are computed and confidence scores are calculated based on the weights at time TN. In various embodiments, a test may be conducted if there is a substantial increase in relationship triples and another round of training may be triggered if an error rate is above a configured threshold. For example, the test may be based on a pre-defined manually labeled test set or a set-aside (i.e., not used for training) automatically promoted training set. As one example, the error rate 'E' can be defined as:

$$E = \sum_{i=1,2,\ldots T} (Xi - Si)^2 \, n/N$$

Where 'n' is the number of new relationships, 'N' is the total number of relationships, 'T' is the size of the test set, 'X' is the calculated score based weights at 'TN' and 'S' is the target score.

Components to implement various aspects of the present disclosure may, for example, include: a relationship extraction module; a training set; a trainable confidence model; a feature calculator; a promotion module; and a knowledge graph training module. The relationship extraction module may be implemented as a layer on top of a multiple entity/relationship technology that is used to populate a KG with extracted relationship triples. Initially, the training set may be derived from relationships between entities that have been manually labeled 'good' or 'bad'. In various embodiments, the trainable confidence model as described by weights and feature vectors are configured to generate confidence scores based on values of feature vectors. The feature calculator is configured to update values of the feature vectors. The promotion module is configured to calculate robustness scores for relationship triples and to compare the robustness scores to established thresholds (to facilitate automatic inclusion of a relationship triple in a training set or to facilitate flagging a relationship triple for human inspection) and determine whether a relationship triple should be promoted to the training set for future training iterations. In various embodiments, the knowledge graph training module handles scheduled training/testing tasks or training/testing tasks that are triggered on demand.

In one or more embodiments, the disclosed techniques utilize dynamic features of data sources to dynamically adjust confidence scores for relationships between entities of a KG. In at least one embodiment, a self-adaptive model is implemented to adjust confidence scores for each relationship triple. It should be appreciated that a confidence score may change based on dynamic feature changes, model updates triggered when a threshold (e.g., an error rate of a testing set) is reached, and/or due to scheduled/periodic model updates. In various embodiments, relationship triples may be automatically promoted to a training set for future training iterations. In one or more embodiments, 'social behavior', such as 'click logs' or 'klout' scores, is utilized to augment a technology centric approach (e.g., SIRE confidence score based on context) to improve accuracy of downstream analytics activities. Optimizing a KG by assigning confidence scores to relationships between entities generally improves user search relevancy, provides additional information regarding a strength of an association between two entities, and typically improves overall performance and accuracy of a KG system. Assigning confidence scores to relationships between entries in a KG usually has immediate user benefit in reduced data manipulation and increased knowledge development.

A confidence score can be used to select the most credible relationship for downstream tasks, e.g., filtered presentation or export. Employing confidence scores in association with relationships between entities is especially effective in preventing an incorrect relationship from overwhelming users due to noise in data (e.g., social media). In general, employing confidence scores in association with relationships between entities improves a confidence level in entity relationships extracted from a dynamic data source (e.g., a social data source), as well as improving search relevancy and entity disambiguation. Employing confidence values in association with relationships between entities also tends to increase user productivity.

Figure 1:
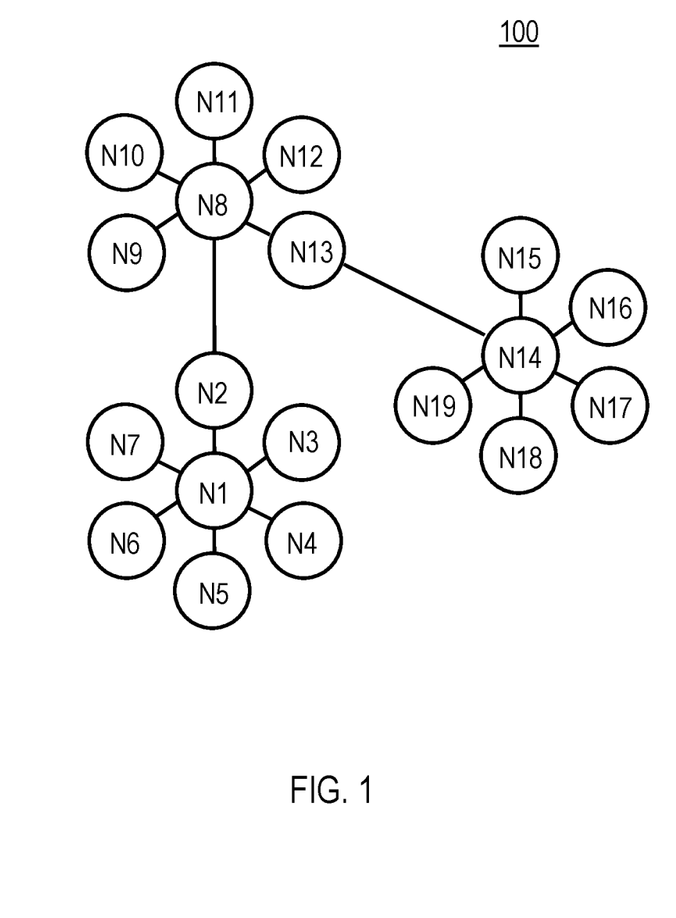
FIG. 1 is a diagram of an exemplary high performance computing (HPC) cluster that includes a number of nodes, with one or more of the nodes including multiple processors that are configured to function as a question answering (QA) system and/or information retrieval system, according to various aspects of the present disclosure.

Conventionally, the Watson system has explored large amounts of structured and unstructured data to find candidate answers for a question (or a problem). According to various aspects of the present disclosure, techniques for performing high performance computing (HPC), or network computing, are described herein that facilitate assigning confidence scores to relationship entries in a knowledge graph. With reference to FIG. 1, an example topology for a relevant portion of an exemplary HPC cluster (supercomputer) 100 includes a number of nodes (N1-N18) that are connected in, for example, a three-dimensional (3D) Torus topology. Each of the nodes (N1-N18) may include one or more symmetric multiprocessors (SMPs). While eighteen nodes are illustrated in FIG. 1, it should be appreciated that more or less than eighteen nodes may be present in an HPC cluster configured according to the present disclosure.

Figure 2:
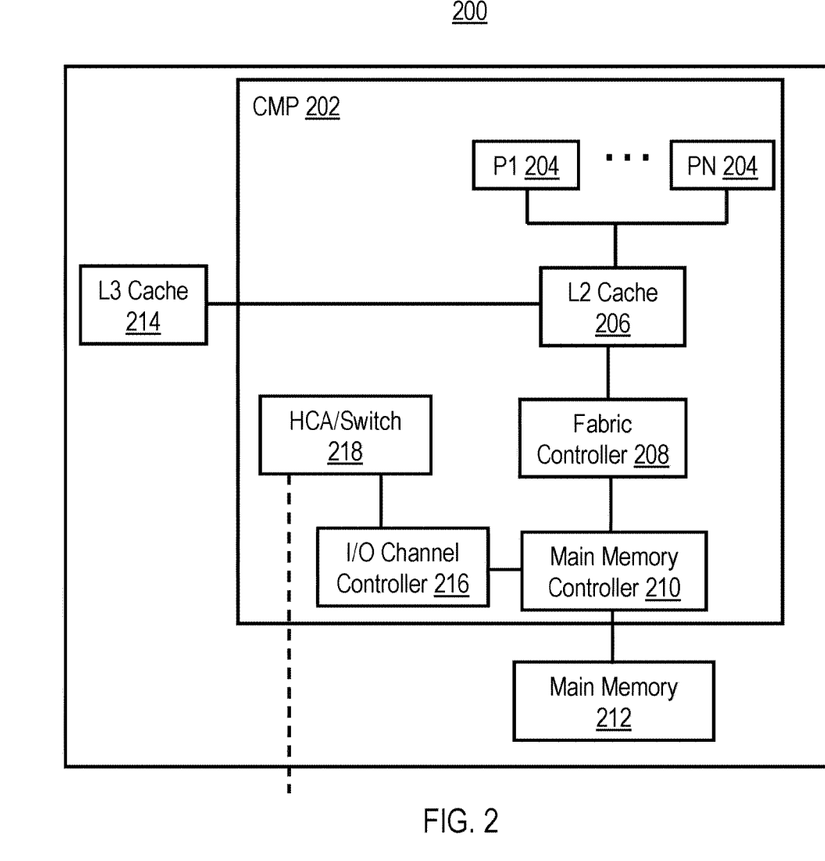
FIG. 2 is a diagram of a relevant portion of an exemplary symmetric multiprocessor (SMP) data processing system included in one of the nodes of FIG. 1, according to an embodiment of the present disclosure.

With reference to FIG. 2, each of the nodes N1-N18 of FIG. 1 may include a processor system, such as data processing system 200. As is illustrated, data processing system 200 includes one or more chip-level multiprocessors (CMPs) 202 (only one of which is illustrated in FIG. 2), each of which includes multiple (e.g., eight) processors 204. Processors 204 may, for example, operate in a simultaneous multithreading (SMT) mode or a single thread (ST) mode. When processors 204 operate in the SMT mode, processors 204 may employ multiple separate instruction fetch address registers to store program counters for multiple threads.

In at least one embodiment, processors 204 each include a first level (L1) cache (not separately shown in FIG. 2) that is coupled to a shared second level (L2) cache 206, which is in turn coupled to a shared third level (L3) cache 214. The L1, L2, and 3 caches may be combined instruction and data caches or correspond to separate instruction and data caches. In the illustrated embodiment, L2 cache 206 is further coupled to a fabric controller 208 that is coupled to a main memory controller (e.g., included in a Northbridge) 210, which supports a main memory subsystem 212 that, in various embodiments, includes an application appropriate amount of volatile and non-volatile memory. In alternative embodiments, fabric controller 208 may be omitted and, in this case, L2 cache 206 may be directly connected to main memory controller 210.

Fabric controller 208, when implemented, facilitates communication between different CMPs and between processors 204 and memory subsystem 212 and, in this manner, functions as an interface. As is further shown in FIG. 2, main memory controller 210 is also coupled to an I/O channel controller (e.g., included in a Southbridge) 216, which is coupled to a host channel adapter (HCA)/switch block 218. HCA/switch block 218 includes an HCA and one or more switches that may be utilized to couple CMP 202 to CMPs in other nodes (e.g., I/O subsystem nodes and processor nodes) of HPC cluster 100.

Figure 3:
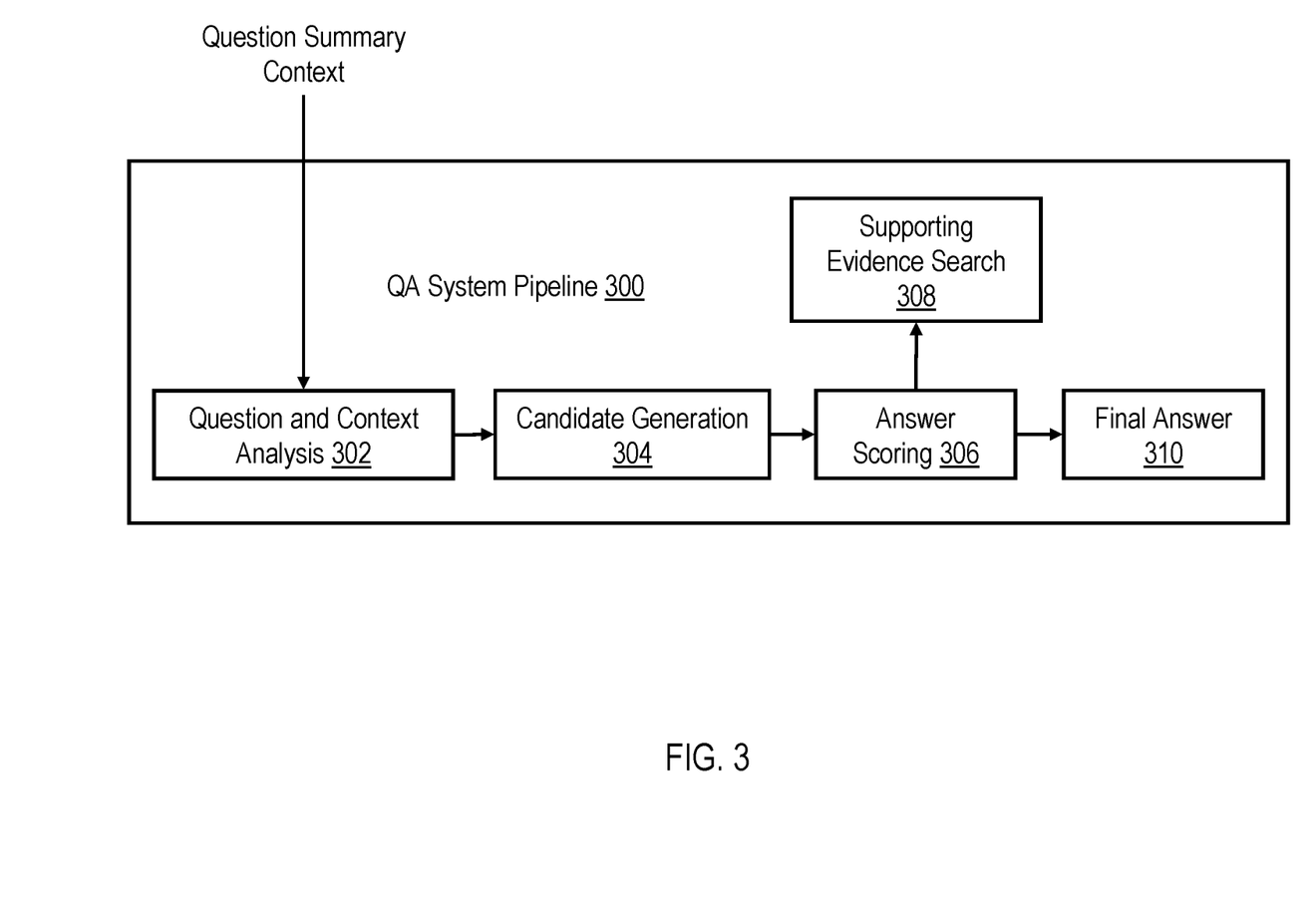
FIG. 3 depicts relevant components of an exemplary data processing system pipeline in the form of a question answering (QA) system pipeline.

FIG. 3 illustrates relevant components of a QA system pipeline for an exemplary QA system. As is illustrated in FIG. 3, a question and context analysis block 302 of QA system pipeline 300 receives a question (e.g., in the form of a question summary context) as an input and generates an output representing its analysis of the question and the context of the question. A candidate generation block 304 of QA system pipeline 300 receives the output from question and context analysis block 302 at an input and generates candidate answers for the question. The candidate answers are provided to an input of an answer scoring block 306, which is configured to initiate a supporting evidence search (by supporting evidence search block 308) in order to score the various generated answers. The results of the answer scoring are provided to a final answer block 310, which is configured to provide a final answer to the question based on the scoring of the candidate answers. It should be appreciated that blocks 302-310 may be implemented in program code executing on one or more processor cores or may be directly implemented in dedicated hardware (logic).

Figure 4:
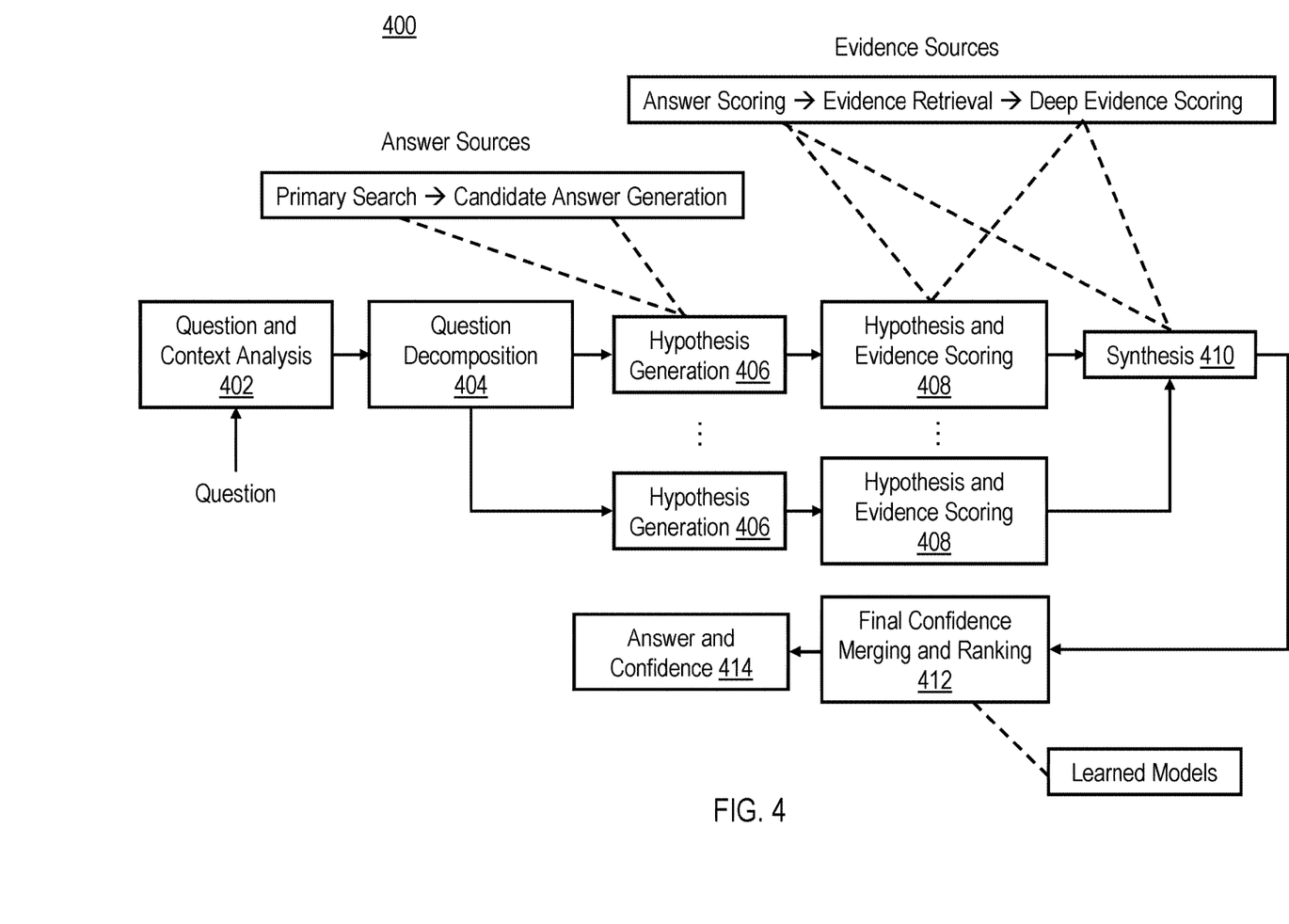
FIG. 4 depicts relevant components of an exemplary QA system pipeline, similar to the QA system pipeline of FIG. 3, in additional detail.

FIG. 4 illustrates relevant components of an exemplary QA system pipeline 400 in additional detail. As is illustrated, question and analysis context block 402 receives a question in a natural language. An output of block 402 is provided to a question decomposition block 404, which further analyzes the different textual, grammatical, linguistic, punctuation and/or other components of the question. Block 404 provides inputs to multiple hypothesis generation blocks 406, which perform parallel hypothesis generation. Hypothesis generation blocks 406 each perform a primary search, collect reference data from different structured and unstructured sources, and generate candidate answers. For example, data generated by hypothesis 'i' may be referenced as 'D_i', and data generated by hypothesis T may be referenced as 'D_j'. The data 'D_i' and 'D_j' may be the same data, completely different data, or may include overlapping data.

As one example, a QA system may be configured, according to the present disclosure, to: receive a question; create 'N' hypotheses (1 . . . N) to find candidate answers (e.g., N=10); and load data for each hypothesis 'i' on which to operate into a shared cache. For example, assuming a shared cache across all hypotheses, 1/Nth of the shared cache may be loaded with data for each hypothesis to operate on. The QA system may be further configured to execute the 'N' hypotheses to return 'M' candidate answers (in this case, each hypothesis generates one or more candidate answers). For example, the notation 'ANS_i' may be employed to denote a set of candidate answers generated by hypothesis 'i'. In various embodiments, hypothesis and evidence scoring for each hypothesis is initiated in hypothesis and evidence scoring blocks 408. That is, the QA system is further configured to score all the candidate answers using hypothesis and evidence scoring techniques (e.g., providing 'M' scores for 'M' candidate answers). In synthesis block 410 the QA system evaluates the candidate answers with the highest scores and determines which hypotheses generated the highest scores.

Following block 410, the QA system initiates final confidence merging and ranking in block 412. Finally, in answer and confidence block 414, the QA system provides an answer (and may provide a confidence score) to the question. Assuming, for example, the candidate answers 'j', 'k', and 'l' have the highest scores, a determination may then be made as to which of the hypotheses generated the best candidate answers. As one example, assume that hypotheses 'c' and 'd' generated the best candidate answers 'j', 'k', and 'l'. The QA system may then upload additional data required by hypotheses 'c' and 'd' into the cache and unload data used by other hypotheses from the cache. According to the present disclosure, the priority of what data is uploaded is relative to candidate scores (as such, hypotheses producing lower scores have less associated data in cache). When a new question is received, the above-described process is repeated. If the hypotheses 'c' and 'd' again produce best candidate answers, the QA system loads more data that is relevant to the hypotheses 'c' and 'd' into the cache and unloads other data.

If, on the other hand, hypotheses 'h' and 'g' produce the best candidate answers to the new question, the QA system loads more data relevant to the hypotheses 'h' and 'g' into the cache and unloads other data. It should be appreciated that, at this point, hypotheses 'c' and 'd' probably still have more data in the cache than other hypotheses, as more relevant data was previously loaded into the cache for the hypotheses 'c' and 'd'. According to the present disclosure, the overall process repeats in the above-described manner by basically maintaining data in the cache that answer and evidence scoring indicates is most useful. The disclosed process may be unique to a QA system when a cache controller is coupled directly to an answer and evidence scoring mechanism of a QA system.

Figure 5:
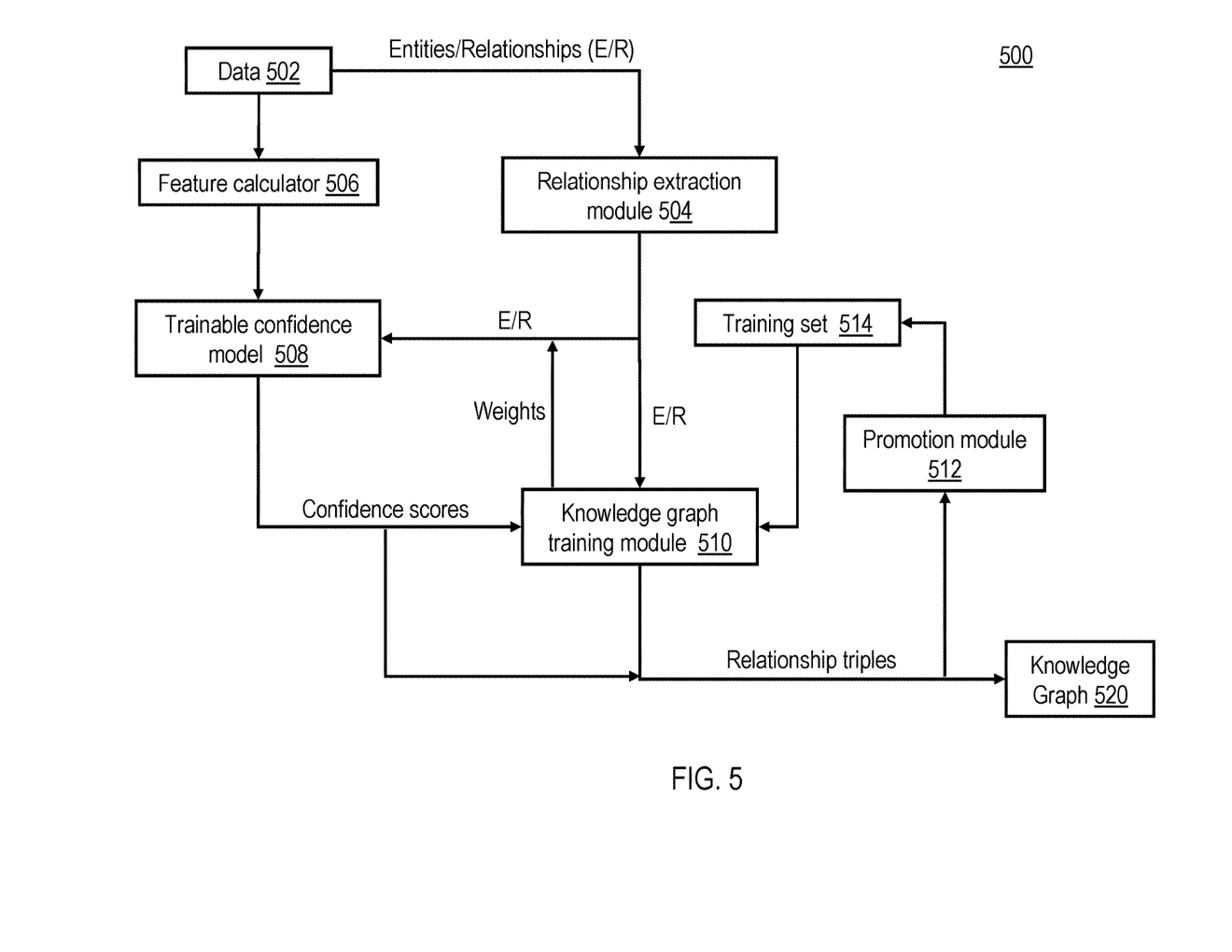
FIG. 5 is a diagram of relevant portions of a QA system that assigns confidence scores to relationship entries (e.g., relationship triples) in a knowledge graph (KG) according to one aspect of the present disclosure.

With reference to FIG. 5, a relevant portion of a knowledge graph (KG) system 500 is illustrated that is configured, according to the present disclosure, to assign confidence scores to relationship entries in a KG. As is illustrated, relationship extraction module 504 is configured to extract entities and relationships from data 502, which may include structured and/or unstructured data. As one example, relationship extraction module 504 may be implemented as a layer on top of a multiple entity/relationship technology that is used to populate a KG 520 with extracted relationship triples. Feature calculator 506 is also configured to access data 502 and extracted relationships from module 504 to derive values for feature vectors that take into account both dynamic and static features of relationships extracted by module 504. Feature calculator 506 provides the feature vectors to trainable confidence model 508, which is configured to generate confidence scores based on the feature vectors.

In one or more embodiments, training set 514 is initially derived from relationships between entities that have been manually labeled (e.g., by an expert) to be 'good' or 'bad'. Promotion module 512 is configured to calculate robustness scores for relationship triples and to compare the robustness scores to established thresholds (to facilitate automatic inclusion of a relationship triple in training set 514 or to facilitate flagging a relationship triple for human inspection) and determine whether a relationship triple should be promoted to training set 514 for future training iterations. Knowledge graph training module 510 handles scheduled training/testing tasks or training/testing tasks that are triggered on demand.

Figure 6:
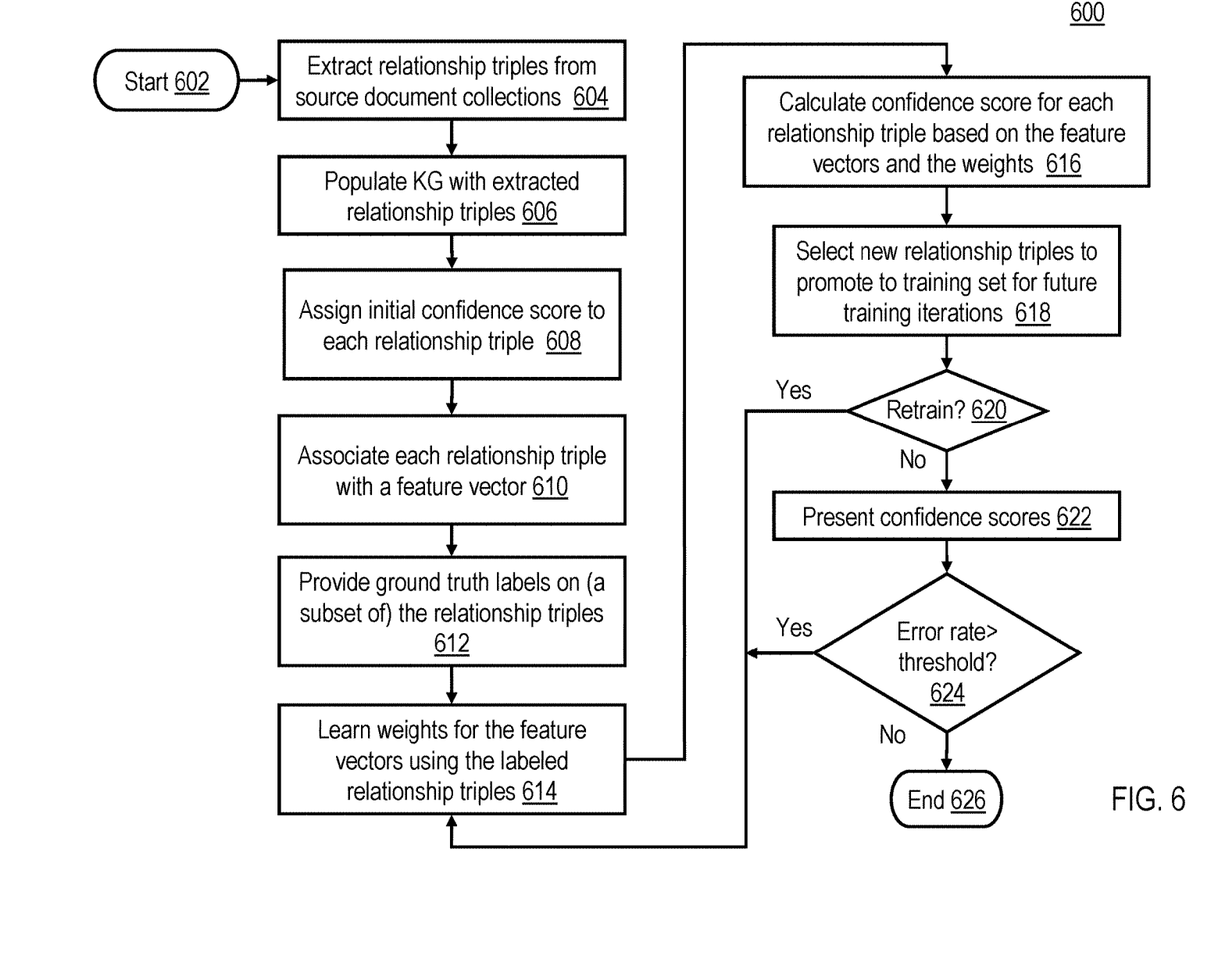
FIG. 6 is a flowchart of an exemplary process for assigning confidence scores to relationship entries (e.g., relationship triples) in a KG according to an embodiment of the present disclosure.

With reference to FIG. 6, a process 600 for assigning confidence scores to relationship triples of a KG is illustrated. Process 600 may, for example, be executed by one or more data processing systems 200 that implement KG system 500. KG system 500 may, for example, be implemented within question decomposition block 404 of FIG. 4 of QA system pipeline 400. In block 602 process 600 is initiated by data processing system 200, e.g., in response to a user initiating a QA session by inputting a question into QA system pipeline 400. Next, in block 604, KG system 500 extracts relationship triples from source document collections. Then, in block 606, KG system 500 populates a KG with extracted relationship triples. Next, in block 608, KG system 500 assigns an initial confidence score to each relationship triple. As previously mentioned, assigning an initial confidence score to each relationship triple may be implemented by, for example, setting initial confidence scores to a midpoint of an accepted range or to random values distributed around the midpoint. Prior knowledge about relationships between entities may also be utilized to determine that initial scores should be set on one side of the midpoint.

Then, in block 610, KG system 500 associates each relationship triple with a feature vector whose value represents both static features and dynamic features. Static features are things that do not change, e.g., document(s), collection(s), and tool(s) from which a relationship was extracted. Dynamic features may include things such as a reputation of an author of the source (e.g., a 'klout' score) and supporting search-engine 'click log' data. As dynamic features, by definition, change over time a periodic recalculation of the confidence scores may be desirable. Depending on the nature of the features and availability of prior knowledge (e.g., expertise of a curator), the feature vectors (which can be either generated via an unsupervised machine learning model or manually created) may be encoded as nominal, ordinal, or continuous values. As previously noted feature vectors may take into account: the technologies used to extract entities and relationships between the entities from data (e.g., SIRE, System T, OpenNLP); the sources that provide the data (e.g., AP News, Wikipedia, NY Times); the number of times a relationship is mentioned; the relationship type (e.g., LocatedAt); the source entity type (e.g., person, equipment); the target entity type (e.g., building, airport); the source author's 'klout' score; and/or the 'click log' count (indicates popularity).

Next, in block 612, KG system 500 associates a number of ground truth labels with (a subset of) the initial relationship triples. As previously mentioned, the ground truth labels may be derived from a curated source of relationships or from a trusted user or users. Then, in block 614, KG system 500 learns initial weights (values) for the feature vectors using the relationship triples, labeled with ground truth data, as training data. Ideally, all feature vectors in a training set are assigned values and cover as many encodings as possible, e.g., using orthogonal experimental design method (OEDM). Next, in block 616, KG system 500 calculates a confidence score for each relationship triple based on the initial weights for the feature vectors. As one example, a confidence score for a relationship triple may correspond to the initial weight or some fraction of the initial weight. Next, in block 618, KG system 500 selects new relationship triples to promote to the training set for future training iterations (e.g., based on robustness). Then, in decision block 620, KG system 500 determines whether retraining is required. For example, retraining by KG training module 510 may be required in response to the new relationship triples exceeding a threshold level. In response to retraining being indicated in block 620 control returns to block 614. In response to retraining not being indicated in block 620 control transfers to block 622, where confidence scores (which are used to rank relationship triples) are presented to a user.

Next, in decision block 624, KG system 500 determines whether an error rate is greater than a threshold level. In response to the error rate being greater than the threshold level in block 624 control returns to block 614. In response to the error rate not being greater than the threshold level in block 624 control transfers to block 626, where process 600 terminates. It should be appreciated that when new relationship triples are added it is generally desirable to re-compute weights for feature vectors and confidence scores.

Figure 7:
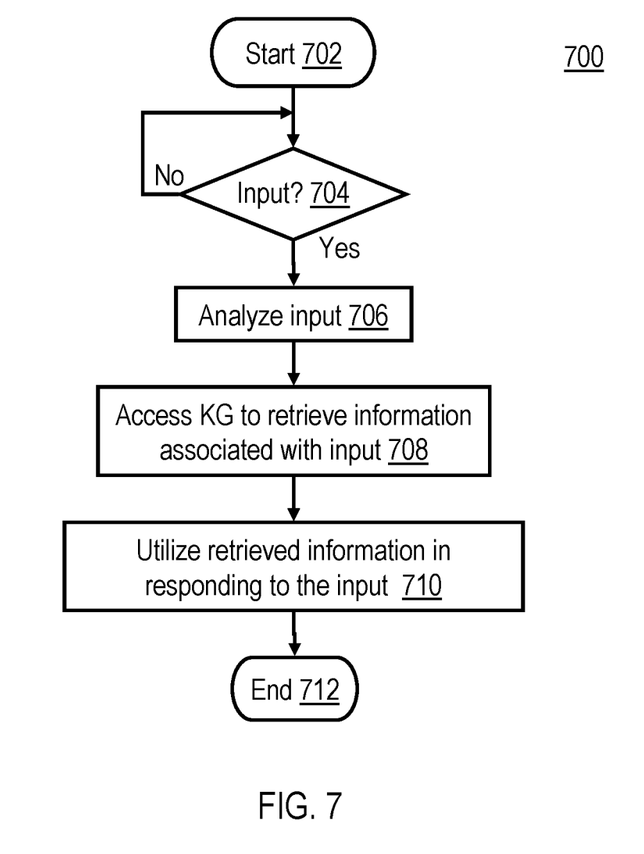
FIG. 7 is a flowchart of an exemplary process that accesses a KG constructed according to FIG. 6 to generate a response to user input.

With reference to FIG. 7, a process 700 is illustrated that may, for example, access an appropriate knowledge graph (KG) that is generated per process 600. As noted above, a KG supports analysis of entities included within the KG and may, for example, be utilized by a question answering (QA) system to answer a received question or by a search system to provide relevant results to a search query. Process 700 may, for example, be implemented within various blocks of QA system pipeline 400. Process 700 is initiated in block 702 at which point control transfers to decision block 704. In block 704 QA system pipeline 400 determines whether input, e.g., in the form of a question, has been received. In response to input not being received in block 704 control loops on block 704. In response to input being received in block 704 control transfers to block 706, where pipeline 400 analyzes the input. Next, in block 708, pipeline 400 accesses an appropriate KG using respective confidence scores to retrieve information associated with the input. Then, in block 710, pipeline 400 utilizes the information retrieved from the KG in responding to the input. For example, when the input is a question, pipeline 400 utilizes the retrieved information to answer the question. Following block 710 process 700 terminates in block 712.

Accordingly, techniques have been disclosed herein that advantageously maintain confidence scores for relationship entries in a knowledge graph.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method of assigning confidence scores to relationship entries in a knowledge graph, comprising:
   assigning, using a data processing system, respective initial confidence scores to relationship n-tuples in a knowledge graph (KG), wherein each of the relationship n-tuples designates at least a first entity, a second entity, and a relationship between the first and second entities or a single entity and a relationship between the single entity and one or more properties of the single entity;
   associating, using the data processing system, respective feature vectors with each of the relationship n-tuples, wherein the feature vectors are encoded with values representing a technology used to extract the first and second entities from data and a source that provided the data;
   generating, using the data processing system, a training set that includes at least a subset of the relationship n-tuples labeled with respective ground truth labels;

learning, using the data processing system, respective initial weights for the feature vectors based on the training set; and generating, using the data processing system, respective subsequent confidence scores for each of the relationship n-tuples based on the initial weights for the feature vectors.

2. The method of claim 1, wherein the method further comprises:

extracting the relationship n-tuples from the data; and populating the KG with the extracted relationship n-tuples.

3. The method of claim 1, wherein the features vectors have associated dynamic features and associated static features and the method further comprises:

determining that one or more of the dynamic features associated with one or more of the feature vectors has changed;

in response to determining that one or more of the dynamic features associated with one or more of the feature vectors has changed, learning respective new weights for the feature vectors; and generating respective new confidence scores for each of the relationship n-tuples based on the new weights for the feature vectors.

4. The method of claim 3, wherein the dynamic features include one or more of a 'klout' score and a 'click log' score.

5. The method of claim 1, wherein the method further comprises:

determining that one or more new relationship n-tuples should be promoted to the training set;

modifying the training set to include the new relationship n-tuples;

learning respective new weights for the feature vectors based on the modified training set; and generating respective new confidence scores for each of the relationship n-tuples based on the new weights for the feature vectors.

6. The method of claim 5, wherein the new relationship n-tuples are selected for promotion to the training set based on a confidence score and a robustness of the new relationship n-tuples.

7. The method of claim 6, wherein the new relationship n-tuples that are automatically added to the training set are weighted differently than the new relationship n-tuples that are not automatically added to the training set.

8. A computer program product configured to assign confidence scores to relationship entries in a knowledge graph, the computer program product comprising:

a computer-readable storage device; and computer-readable program code embodied on the computer-readable storage device, wherein the computer-readable program code, when executed by a data processing system, causes the data processing system to:

assign respective initial confidence scores to relationship n-tuples in a knowledge graph (KG), wherein each of the relationship n-tuples designates at least a first entity, a second entity, and a relationship between the first and second entities or a single entity and a relationship between the single entity and one or more properties of the single entity;

associate respective feature vectors with each of the relationship n-tuples, wherein the feature vectors are encoded with values representing a technology used to extract the first and second entities from data and a source that provided the data;

generate a training set that includes at least a subset of the relationship n-tuples labeled with respective ground truth labels;

learn respective initial weights for the feature vectors based on the training set; and generate respective subsequent confidence scores for each of the relationship n-tuples based on the initial weights for the feature vectors.

9. The computer program product of claim 8, wherein the computer-readable program code, when executed by the data processing system, further causes the data processing system to:

extract the relationship n-tuples from the data; and populate the KG with the extracted relationship n-tuples.

10. The computer program product of claim 8, wherein the features vectors have associated dynamic features and associated static features and the computer-readable program code, when executed by the data processing system, further causes the data processing system to:

determine that one or more of the dynamic features associated with one or more of the feature vectors has changed;

in response to determining that one or more of the dynamic features associated with one or more of the feature vectors has changed, learn respective new weights for the feature vectors; and generate respective new confidence scores for each of the relationship n-tuples based on the new weights for the feature vectors.

11. The computer program product of claim 10, wherein the dynamic features include one or more of a 'klout' score and a 'click log' score.

12. The computer program product of claim 8, wherein the computer-readable program code, when executed by the data processing system, further causes the data processing system to:

determine that one or more new relationship n-tuples should be promoted to the training set;

modify the training set to include the new relationship n-tuples;

learn respective new weights for the feature vectors based on the modified training set; and generate respective new confidence scores for each of the relationship n-tuples based on the new weights for the feature vectors.

13. The computer program product of claim 12, wherein the new relationship n-tuples are selected for promotion to the training set based on a confidence score and a robustness of the new relationship n-tuples.

14. The computer program product of claim 13, wherein the new relationship n-tuples that are automatically added to the training set are weighted differently than the new relationship n-tuples that are not automatically added to the training set.

15. A data processing system, comprising:

a cache memory; and a processor coupled to the cache memory, wherein the processor is configured to:

assign respective initial confidence scores to relationship n-tuples in a knowledge graph (KG), wherein each of the relationship n-tuples designates at least a first entity, a second entity, and a relationship between the first and second entities or a single entity and a relationship between the single entity and one or more properties of the single entity;

associate respective feature vectors with each of the relationship n-tuples, wherein the feature vectors are encoded with values representing a technology used to extract the first and second entities from data and a source that provided the data;

generate a training set that includes at least a subset of the relationship n-tuples labeled with respective ground truth labels;

learn respective initial weights for the feature vectors based on the training set; and generate respective subsequent confidence scores for each of the relationship n-tuples based on the initial weights for the feature vectors.

16. The data processing system of claim 15, wherein the processor is further configured to:

extract the relationship n-tuples from the data; and populate the KG with the extracted relationship n-tuples.

17. The data processing system of claim 15, wherein the features vectors have associated dynamic features and associated static features and the processor is further configured to:

determine that one or more of the dynamic features associated with one or more of the feature vectors has changed;

in response to determining that one or more of the dynamic features associated with one or more of the feature vectors has changed, learn respective new weights for the feature vectors; and generate respective new confidence scores for each of the relationship n-tuples based on the new weights for the feature vectors.

18. The data processing system of claim 17, wherein the dynamic features include one or more of a 'klout' score and a 'click log' score.

19. The data processing system of claim 15, wherein the processor is further configured to:

determine that one or more new relationship n-tuples should be promoted to the training set;

modify the training set to include the new relationship n-tuples;

learn respective new weights for the feature vectors based on the modified training set; and generate respective new confidence scores for each of the relationship n-tuples based on the new weights for the feature vectors.

20. The data processing system of claim 19, wherein the new relationship n-tuples are selected for promotion to the training set based on a confidence score and a robustness of the new relationship n-tuples, and wherein the new relationship n-tuples that are automatically added to the training set are weighted differently than the new relationship n-tuples that are not automatically added to the training set.

* * * * *